(12) United States Patent
Lin et al.

(10) Patent No.: US 8,553,404 B2
(45) Date of Patent: Oct. 8, 2013

(54) MOUNTING APPARATUS FOR DATA STORAGE DEVICE

(75) Inventors: Chieh-Hsiang Lin, New Taipei (TW); Chih-Min Lin, New Taipei (TW); Wen-Tang Peng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 127 days.

(21) Appl. No.: 13/204,729

(22) Filed: Aug. 8, 2011

(65) Prior Publication Data

US 2012/0162893 A1   Jun. 28, 2012

(30) Foreign Application Priority Data

Dec. 24, 2010   (TW) .............................. 99145959 A

(51) Int. Cl.
G06F 1/16 (2006.01)
H05K 5/00 (2006.01)
H05K 7/00 (2006.01)

(52) U.S. Cl.
USPC ............ 361/679.33; 361/679.31; 361/679.37; 248/274.1; 312/223.2

(58) Field of Classification Search
USPC ............. 361/679.31, 679.34, 679.37, 379.39, 361/728, 729, 730, 732, 740, 747
See application file for complete search history.

(56) References Cited

U.S. PATENT DOCUMENTS

| | | | |
|---|---|---|---|
| 6,351,374 B1* | 2/2002 | Sherry ..................... | 361/679.33 |
| 6,483,107 B1* | 11/2002 | Rabinovitz et al. ........... | 250/239 |
| 6,661,651 B1* | 12/2003 | Tanzer et al. ............ | 361/679.33 |
| 7,848,096 B2* | 12/2010 | Peng et al. ............... | 361/679.33 |
| 7,848,099 B1* | 12/2010 | Zhang et al. ............. | 361/679.38 |
| 7,974,088 B2* | 7/2011 | Li ............................ | 361/679.37 |
| 8,023,263 B2* | 9/2011 | Crippen et al. .......... | 361/679.58 |
| 8,035,961 B2* | 10/2011 | Figuerado et al. ....... | 361/679.37 |
| 8,199,482 B2* | 6/2012 | Sanchez et al. .......... | 361/679.38 |
| 8,243,435 B2* | 8/2012 | Li ............................ | 361/679.37 |
| 8,300,398 B2* | 10/2012 | Zhang et al. ............. | 361/679.33 |
| 2001/0001529 A1* | 5/2001 | Behl et al. .................. | 312/223.1 |
| 2004/0085722 A1* | 5/2004 | Tanzer et al. ................. | 361/683 |
| 2005/0157464 A1* | 7/2005 | McAlister ..................... | 361/685 |
| 2008/0062635 A1* | 3/2008 | Chang ........................... | 361/685 |
| 2008/0080130 A1* | 4/2008 | Chen ............................. | 361/685 |
| 2008/0158808 A1* | 7/2008 | Camarena et al. ............ | 361/685 |
| 2008/0204994 A1* | 8/2008 | Wang ............................ | 361/685 |
| 2008/0244052 A1* | 10/2008 | Bradicich et al. ............. | 709/223 |
| 2008/0266781 A1* | 10/2008 | Olesiewicz et al. ........... | 361/685 |
| 2009/0091884 A1* | 4/2009 | Walker et al. ............. | 361/679.37 |
| 2009/0237876 A1* | 9/2009 | Suzuki et al. ............. | 361/679.33 |
| 2010/0321879 A1* | 12/2010 | Peng et al. ............... | 361/679.33 |
| 2011/0101831 A1* | 5/2011 | Wang et al. ................. | 312/223.1 |
| 2012/0147547 A1* | 6/2012 | Lin et al. .................. | 361/679.31 |
| 2012/0162894 A1* | 6/2012 | Lin et al. .................. | 361/679.31 |

* cited by examiner

*Primary Examiner* — Adrian S Wilson
*Assistant Examiner* — Abhishek Rathod
(74) *Attorney, Agent, or Firm* — Altis & Wispro Law Group, Inc.

(57) ABSTRACT

A mounting apparatus includes an enclosure, a bracket for fixing a data storage device, and a resisting member. The bracket includes a base and a handle pivotably mounted to the base. The handle includes a pressing portion. The resisting member is pivotably mounted to the bracket. When the handle is rotated toward the base, the pressing portion of the handle presses a first portion of the resisting member to pivot the resisting member. A second portion of the resisting member extends through the bracket to resist against the enclosure.

14 Claims, 5 Drawing Sheets

MOUNTING APPARATUS FOR DATA STORAGE DEVICE

CROSS-REFERENCE TO RELATED APPLICATIONS

Relevant subject matter is disclosed in two pending U.S. patent applications, with application Ser. Nos. 13/189,575 and 13/191,472, respectively, filed on Jul. 25, 2011 and Jul. 27, 2011, and both entitled "MOUNTING APPARATUS FOR DATA STORAGE DEVICE, which are assigned to the same assignee with this patent application.

BACKGROUND

1. Technical Field

The present disclosure relates to mounting apparatuses and, more particularly, to an apparatus for mounting a data storage device.

2. Description of Related Art

Many electronic devices, such as computers and servers, include data storage devices, such as hard disk drives, compact disk read-only memory drives, digital video disk drives, and floppy disk drives. These devices are added to increase the functionality of the apparatus as desired by a user. The installation of a hard disk drive in a computer often requires screws to attach the hard disk drive to a bracket, and then the bracket is fixed to the chassis of the device. Usually, there is space existing between the bracket and the chassis, which allows vibration in the data storage device or even shocks and jars when the apparatus is moved.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
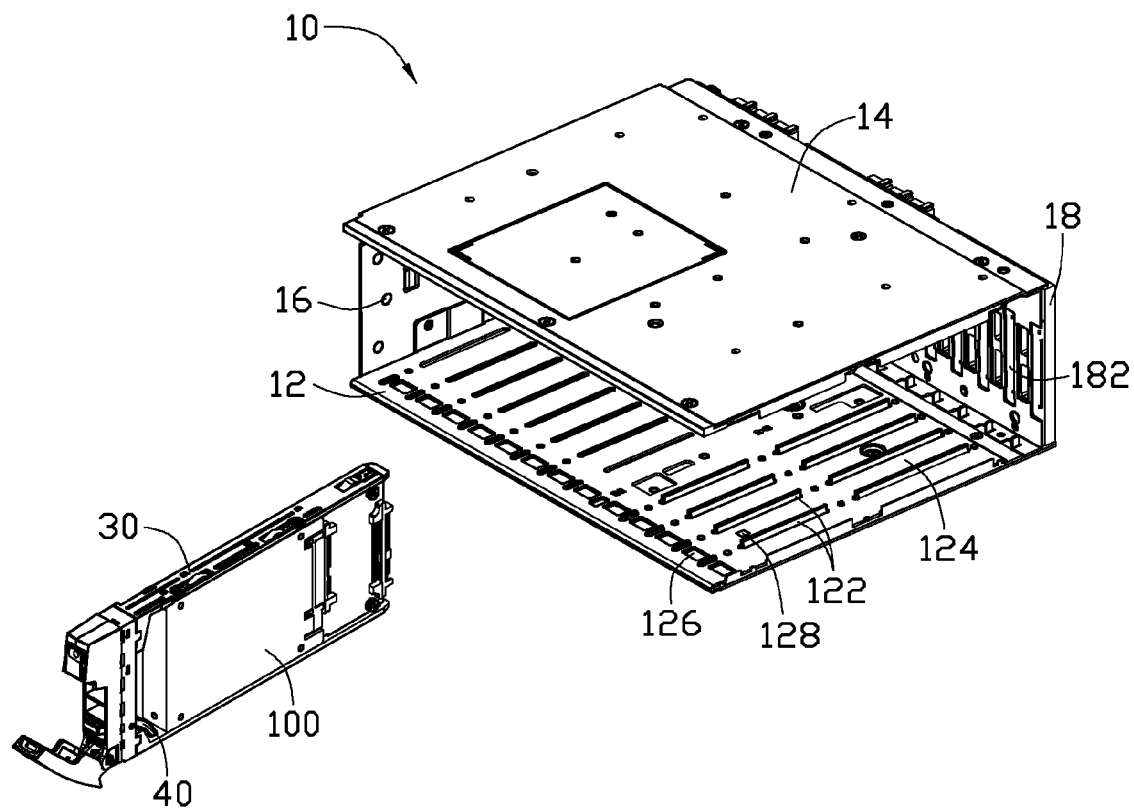
FIG. 1 is an exploded, isometric view of an embodiment of a mounting apparatus and a data storage device, the mounting apparatus includes a bracket.

Referring to FIG. 1, an embodiment of a mounting apparatus is provided to mount a data storage device 100, such as a hard disk drive. The mounting apparatus includes an enclosure 10, a bracket 30 for receiving the data storage device 100, and a resisting module 40.

The enclosure 10 includes a first sidewall 12 and a second sidewall 14 parallel to the first sidewall 12. An opening 16 is bound by the first ends of the first sidewall 12 and the second sidewall 14. An end wall 18 is perpendicularly connected between the second ends of the first sidewall 12 and the second sidewall 14. Two parallel flanges 122 protrude from the first sidewall 12, along the direction of the first end to the second end of the first sidewall 12, to form a slide rail 124 between the flanges 122. The first sidewall 12 defines a locking hole 126 aligning with the slide rail 124 and adjacent to the opening 16. A shockproof member 128 is set on an inner surface of the first sidewall 12 between the flanges 122. A first connector 182 is arranged on the end wall 18, facing the opening 16.

Figure 2:
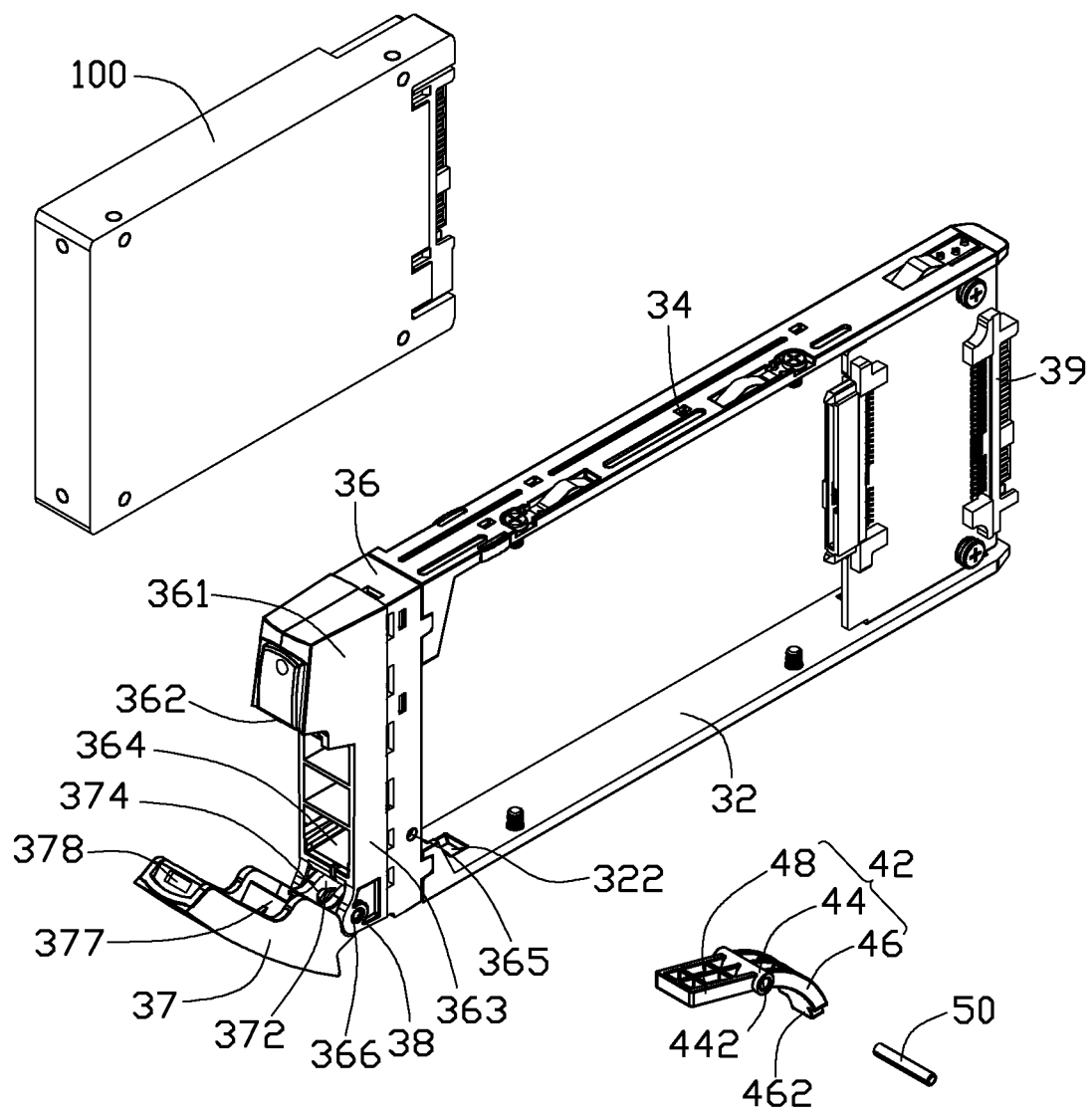
FIG. 2 is an exploded, isometric view of the bracket and the data storage device of FIG. 1.

Referring to FIG. 2, the bracket 30 includes a first mounting plate 32, a second mounting plate 34 parallel to the first mounting plate 32, and a base 36 connected between the first ends of the first mounting plate 32 and the second mounting plate 34. A handle 37 is pivotably mounted to the base 36. A second connector 39 is arranged between the second ends of the first mounting plate 32 and the second mounting plate 34, for electrical connection to the data storage device 100. The first mounting plate 32 defines a through hole 322 adjacent to the base 36. The base 36 includes a main body 361 at a first end of the base 36, and two parallel side plates 363 extending from the main body 361 to a second end of the base 36. A hook 362 is formed on the main body 361. A receiving slot 364 is bounded by the side plates 363. A pivot hole 365 is defined in each side plate 363 and communicates with the receiving slot 364. Two opposite mounting holes 366 are defined in the second end of the base 36. The handle 37 includes two mounting plates 372 formed at a first end of the handle 37. Each mounting plate 372 defines a through hole 374. The handle 37 is pivotably mounted to the second end of the base 36 by means of a shaft 38 extending through the through holes 374 and the mounting holes 366. The handle 37 includes a locking portion 376 (shown in FIG. 4) protruding from the first end of the handle 37, and a pressing portion 377 formed from within the middle of the handle 37, and facing the base 36 when the handle 37 is closed. A locking slot 378 is defined in a second end of the handle 37 opposite to the mounting plates 372.

The resisting module 40 includes a resisting member 42 and a shaft 50. The resisting member 42 includes a pivot portion 44, and a first portion 46 and a second portion 48, each extending from opposite sides of the pivot portion 44. The first portion 46 is curved. The pivot portion 44 defines a through hole 442. A block 462 protrudes from the distal end of the first portion 46.

Figure 3:
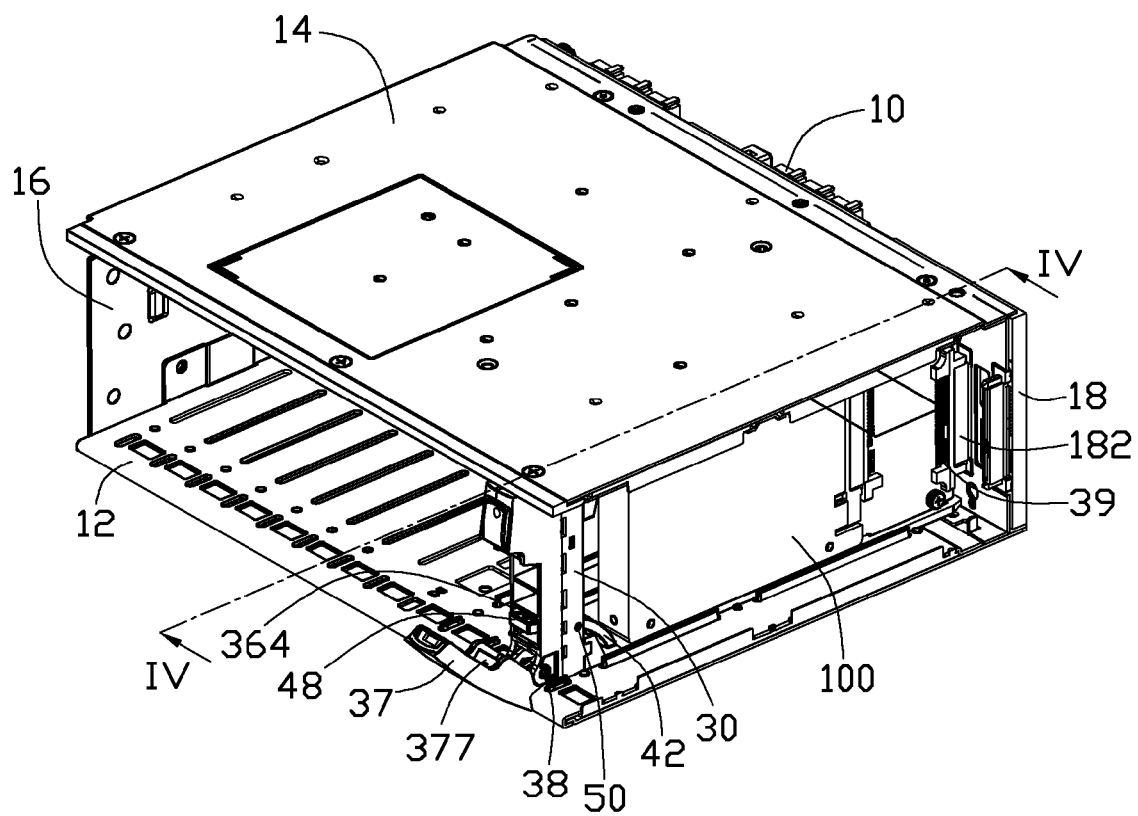
FIG. 3 is an assembled view of FIG. 1.
Figure 4:
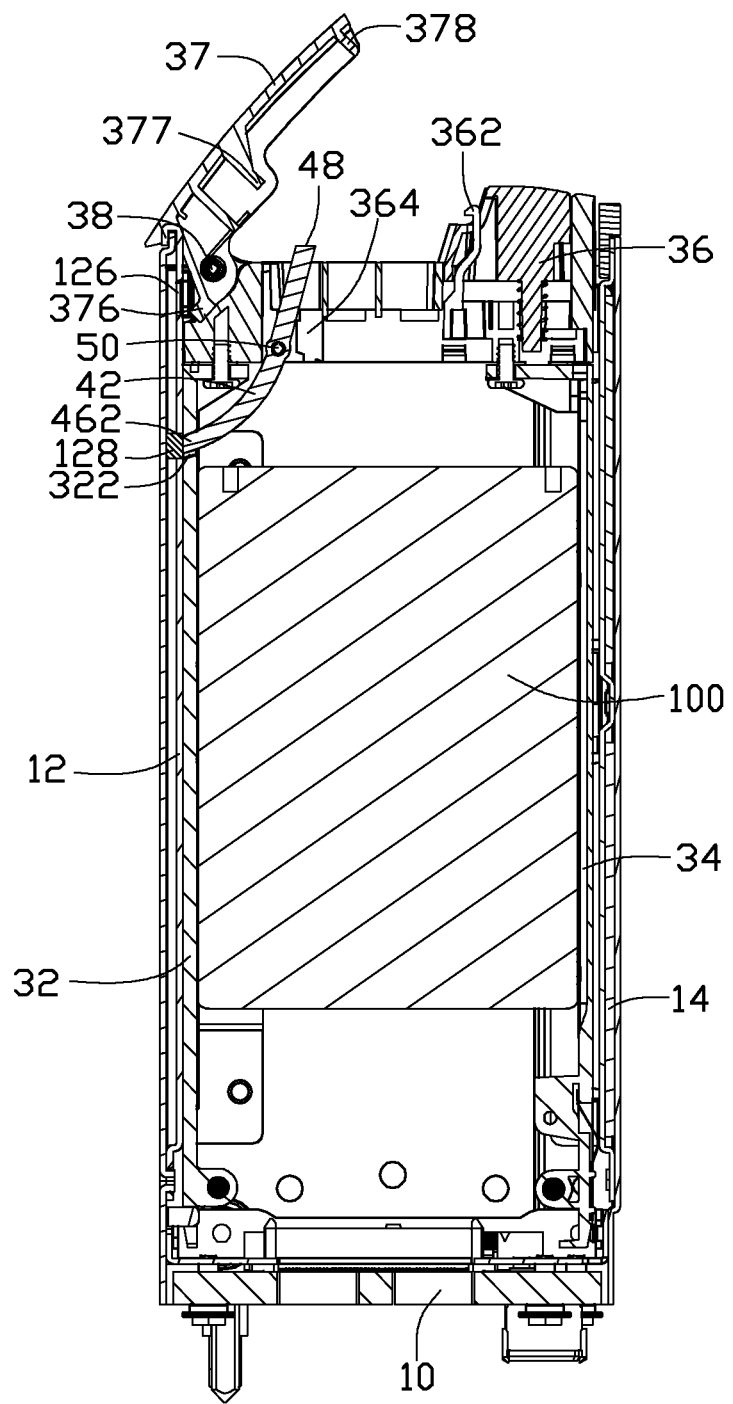
FIG. 4 is a sectional view along the line IV-IV of FIG. 3.

Referring to FIG. 3 and FIG. 4, in assembly, the resisting member 42 extends through the receiving slot 364. The resisting member 42 is pivotably mounted to the bracket 30 through the shaft 50 extending through the pivot holes 365 and the through holes 442. The block 462 is received in the through hole 322.

The data storage device 100 is attached to the bracket 30 between the first mounting plate 32 and the second mounting plate 34. The bracket 30 with the data storage device 100 is slidably received in the enclosure 10 through the opening 16. The bracket 30 is slid into the enclosure 10, with the second connector 39 aligning with the first connector 182. The first mounting plate 32 is slidably received in the slide rail 124. The bracket 30 is pressed home to make the second connector 39 plug into the first connector 182.

Figure 5:
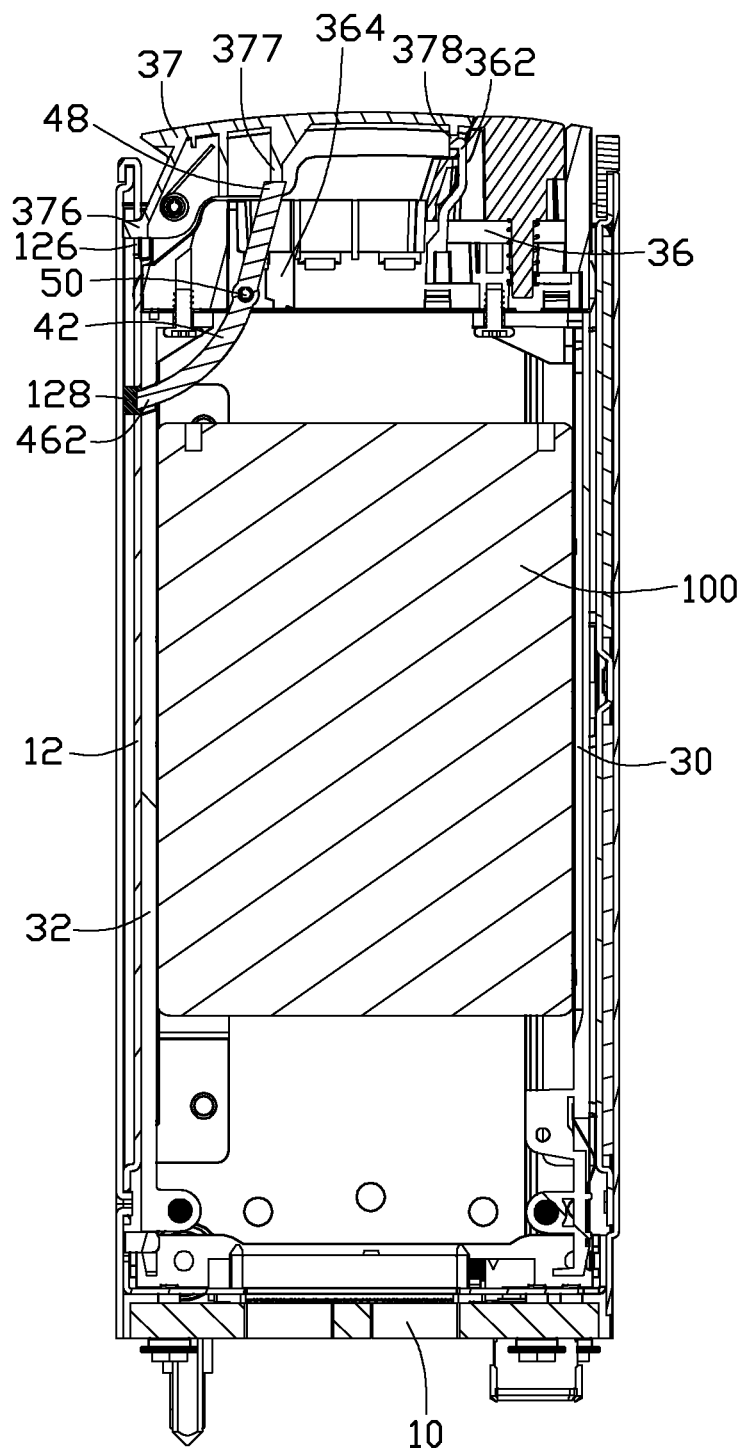
FIG. 5 is similar to FIG. 4, but showing a different state of use.

Referring to FIG. 5, the handle 37 is rotated toward the base 36 by hand. While the handle 37 is rotating, the pressing portion 377 presses the second portion 48 to rotate the resisting member 42 about the shaft 50. The block 462 extends through the through hole 322 to resist against the shockproof member 128, to mount the bracket 30 in the enclosure 10. The locking portion 376 is thereby locked in the locking hole 126, and the hook 362 is locked in the locking slot 378. In another embodiment, the second portion 48 may extend through the through hole 322 to resist directly against the shockproof member 12.

Even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A mounting apparatus for a data storage device, the mounting apparatus comprising:
   an enclosure comprising a first sidewall defining a locking hole;
   a bracket detachably received in the enclosure and to hold the data storage device, wherein the bracket comprises a base, a handle pivotably mounted to the base, and a first mounting plate extending from the base away from the handle, the first mounting plate defines a through hole, the handle comprises a locking portion and a pressing portion; and
   a resisting member pivotably mounted to the bracket, wherein the resisting member comprises a first portion and a second portion;
   wherein when the handle is rotated toward the base, the pressing portion of the handle presses the first portion of the resisting member to pivot the resisting member, the second portion of the resisting member extends through the through hole of the bracket to resist against the first sidewall of the enclosure, and the locking portion of the handle is locked in the locking hole of the enclosure.

2. The mounting apparatus of claim 1, wherein the resisting member further comprises a pivot portion pivotably connected to the bracket, the first portion and the second portion extend from opposite sides of the pivot portion, respectively.

3. The mounting apparatus of claim 2, wherein a block is formed on a distal end of the second portion opposite to the pivot portion to resist against an inner surface of the first sidewall of the enclosure.

4. The mounting apparatus of claim 2, wherein a shockproof member is set on an inner surface of the first mounting plate of the bracket and aligns with the second portion.

5. The mounting apparatus of claim 1, wherein the second portion of the resisting member is curved.

6. The mounting apparatus of claim 1, wherein the enclosure further comprises a second sidewall parallel to the first sidewall, two parallel flanges protrude on the first sidewall, a slide rail is formed between the flanges to receive the first mounting plate of the bracket.

7. The mounting apparatus of claim 1, wherein the base comprises a main body at a first end of the base, and two parallel side plates extending from the main body to a second end of the base, the resisting member is pivotably received between the side plates.

8. An assembly comprising:
   an enclosure comprising a first sidewall, a second sidewall substantially parallel to the first sidewall, and an end wall connected between the first and second sidewalls, wherein a first connector is set on the end wall, the first sidewall defines a locking hole;
   a bracket comprising a first mounting plate, a second mounting plate substantially parallel to the first mounting plate, a base arranged between first ends of the first and second mounting plates, a second connector arranged between second ends of the first and second mounting plates, and a handle pivotably attached to the base, wherein the handle comprises a locking portion and a pressing portion, the first mounting plate defines a through hole;
   a data storage device fixed in the bracket between the first mounting plate and the second mounting plate, wherein the data storage device is connected to the second connector, the second connector is connected to the first connector in response to the bracket being mounted in the enclosure; and
   a resisting member pivotably mounted to the bracket, wherein the resisting member comprises a first portion and a second portion;
   wherein when the handle is rotated toward the base, the pressing portion of the handle presses the first portion to pivot the resisting member, the second portion of the resisting member extends through the through hole of the bracket to resist against the first sidewall of the enclosure, the locking portion of the handle is locked in the locking hole of the enclosure.

9. The assembly of claim 8, wherein the resisting member further comprises a pivot portion pivotably connected to the bracket, the first portion and the second portion extend from opposite sides of the pivot portion.

10. The assembly of claim 9, wherein a block is formed on a distal end of the second portion opposite to the pivot portion to resist against an inner surface of the first sidewall of the enclosure.

11. The assembly of claim 9, wherein a shockproof member is set on an inner surface of the first mounting plate of the bracket and aligns with the second portion.

12. The assembly of claim 8, wherein the second portion is curved.

13. The assembly of claim 8, wherein two parallel flanges protrude on the first sidewall, a slide rail is formed between the flanges to receive the first mounting plate of the bracket.

14. The assembly of claim 8, wherein the base comprises a main body at a first end of the base, and two parallel side plates extending from the main body to a second end of the base, the resisting member is pivotably received between the side plates.

* * * * *